March 10, 1959 T. C. R. SHEPHERD 2,876,953
COMMINUTING APPARATUS
Filed Oct. 3, 1956
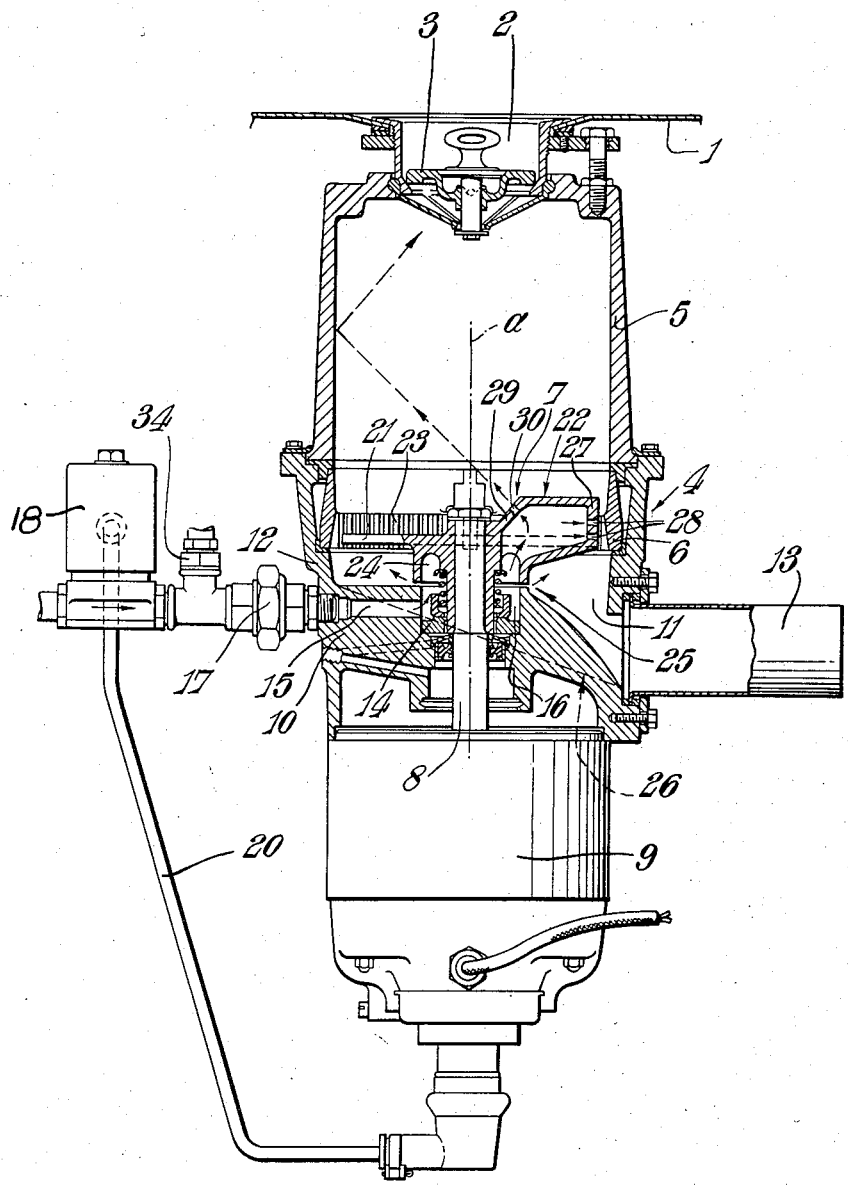
INVENTOR
Thomas Cropper Ryley Shepherd
BY Harness, Dickey & Pierce
ATTORNEYS.

2,876,953

COMMINUTING APPARATUS

Thomas Cropper Ryley Shepherd, Ross-on-Wye, England

Application October 3, 1956, Serial No. 613,759

Claims priority, application Great Britain October 7, 1955

4 Claims. (Cl. 241—38)

This invention concerns comminuting apparatus and relates more particularly to apparatus for comminuting kitchen waste such as tea leaves. The invention, however, has application also to apparatus for comminuting tampons, swabs, wadding and other fibrous material.

It is found in relation to certain kitchen waste, which is particularly exemplified by used tea leaves, that delivering a large quantity of such materials in a wet condition produces a relatively coherent mass in the comminuting apparatus which mass tends to clog the apparatus so that the rotor is prevented from free rotation. There is therefor a serious risk of permanent damage to the comminuting apparatus.

The present invention has for its object to prevent clogging of the apparatus.

An object is to prevent damage of the machine due to clogging.

Another object of the invention resides in reducing the tendency of the materials referred to above from impaction to form a coherent mass within the apparatus.

It is also an object of this invention to ensure that the apparatus be left in a clean and wholesome condition after use.

This invention relates to an apparatus in which material falls upon a rotor rotatable within a ring of teeth, the material being comminuted between the ring of teeth and the rotor and the invention is characterised in that there is means to supply water to the rotor so that the water is thrown therefrom in a direction to act on the material above the rotor and reduce impaction thereof. Preferably the means is arranged to deliver water to within the rotor from which the water is directed under pressure upwardly of the rotor and preferably also a plurality of separate jets of water are directed upwardly from the rotor to converge at, or near to, the axis of rotation of the rotor. Because of the upwardly directed jet of water, materials dropped from above, such as tea leaves, is maintained in temporary suspension and prevented from impaction, the said material being gradually fed to between the ring of teeth and the rotor so that clogging of the rotor is reduced or eliminated.

According to an alternative arrangement of the present invention said means is arranged to direct water down on to the rotor so that the water will ricochet upwardly therefrom the water being at the same time thrown outwardly under centrifugal force.

According to yet another alternative arrangement of this invention in which the rotor is mounted within a casing and material to be comminuted is dropped from above into the casing towards the rotor it is arranged that said means directs water under pressure substantially horizontally against the wall of the casing.

With each of the three arrangements referred to the water washes down the wall of the casing and flows between the teeth of said ring of teeth. In this way it is ensured that the casing and the teeth are clean and maintained in a wholesome condition each time the comminuting apparatus is used. To this end it is preferably arranged that the supply of water is automatically commenced upon starting the drive to the rotor and the water supply continues at least throughout the comminuting operation so that the apparatus is cleaned in the manner referred to.

A practical application of the present invention will now be described, by way of example only, with reference to the accompanying drawing which illustrates in elevation, and mainly in section, an apparatus in accordance with this invention.

Referring to the drawing: the apparatus is illustrated as fitted to the outlet of a kitchen sink, the bottom of which is indicated by the reference numeral 1, the bottom being provided, in conventional manner, with an outlet 2 which may be closed by a plug 3. When the plug is removed or opened material in the sink passes through the opening 2 and into the comminuting apparatus, which is generally indicated by the reference numeral 4.

The apparatus 4 comprises a casing 5 into which the waste material from the sink 1 drops from above. Immediately beneath the receiving chamber 5 is a toothed ring 6 and a rotor 7 mounted on a shaft 8 which is driven by an electric motor 9.

The shaft 8 is supported in a member 10 which defines the bottom of a discharge chamber 11 lying immediately beneath the rotor 7. The chamber 11 has cylindrical walls 12 and a discharge outlet 13.

The bottom member 10 constitutes a housing for a seal 14 which surrounds the shaft 8 and is provided to reduce ingress of material delivered to the apparatus (including water delivered with the material to be comminuted) to the electric motor 9. It has been found that in previous comminuting apparatus material delivered to the apparatus coming into contact with the shaft seal had an excessive abrading action on the seal with the result that its effective life was short. More particularly this is found when comminuting vegetable pairings which are commonly coated with earth particles, sand and the like. In order to reduce excessive wear of the seal 14 a radial channel 15 is provided in the member 10, the channel leading into a space 16 surrounding the seal 14. A water supply pipe 17 is connected to the member 10 so that water may pass along the channel 15 into the space 16 and the flow of water is controlled by a valve 18, the operation of which is determined by the electric motor 9, the latter being coupled to the valve 18, as at 20. It is arranged that when the motor 9 is started the valve 18 is opened and therefore water is delivered to the space 16. The supply of water will be at an adequate pressure to ensure a good flow of water through the space 16 as later described.

The rotor 7 comprises a disc portion 21 which carries a plurality of hollow breakers, generally indicated at 22. The breakers 22 co-act with the teeth 23 of the ring 6 to comminute material dropped into the casing 5, the comminuted material passing between the teeth and between the peripheral edge of the rotor and the teeth into the discharge chamber 11 and being carried away from said chamber through the outlet 13 as more fully described hereinafter.

An axial passageway 24 is formed in the hub of the rotor 7, the passageway 24 being directly opposite to the space 16 which extends through the top of the member 10. The passageway 24 communicates with the interior of the hollow breakers 22 at the inner radial extremities of the breakers.

The rotor 7 is mounted on the shaft 8 so that the lower edge of the rotor is spaced by a small amount from the topmost part of the member 10, a narrow annular gap 25 being defined between the rotor and the member 10.

With the arrangement described water supplied to the space 16 passes axially upwardly into the passage 24 and from thence into the hollow breakers 22 for purposes which will later be referred to. Some of the water passing from the space 16 to the axial passageway 24 discharges through the narrow gap 25 and some of the water subjected to centrifugal pressure within the axial passageway 24 is forced under considerable pressure through said gap.

It will be appreciated that when the comminuting apparatus is brought into use and the motor 9 is started water will be supplied to the space 16 and after flowing around the seal 14 passes, in part, through the narrow gap 25. Since material destructive to the seal 14 can only enter the seal housing through said gap and at all times while the apparatus is in operation a stream of water is being ejected through said gap the stream of ejected water effectively prevents the admission of said material to the seal housing.

The water ejected through the gap 25 is directed over the undersurface of the rotor 7 and against the wall 12 of the chamber 11. Moreover, the water will flow over the upper surface of the member 10. The gap 25 is at the topmost part of the bottom member 10 and said surface slopes downwardly, as at 26, uniformly from the top of the member 10 towards the outlet 13, so that the latter is at the lowest part of the member 10. The water is ejected from the gap 25 near the top of the chamber 11 i. e. against the undersurface of the rotor 7 and towards the top of the wall 12 which is beneath the rotor and above the topmost part of the discharge outlet 13 with the effect that all of the water flows downwardly towards the outlet. The entire surface of the chamber 11 is flushed out by the water ejected from the gap 25 and comminuted material within the chamber 11 is carried by the stream of water to the outlet 13 and discharged therethrough so that after each operation of the comminuting apparatus the chamber 11 will be left in a clean and wholesome condition. This is particularly important since if particles of food and other material remain lodged in the apparatus unpleasant odours will occur and the general cleanliness will be seriously impaired.

Concerning the water which is supplied to the hollow breakers 22: the wall 27 at the outer radial extremity of each breaker is provided with a pair of vertically spaced nozzles 28, the nozzles being directed toward the teeth 23 of the ring 6. The upper of the pair of nozzles 28 is close to the top of the ring of teeth. Water under centrifugal pressure is discharged from the nozzles 28 in an outward radial direction to impinge on the teeth 23. The teeth are of increasing depth in the downward direction. The water impinging on the teeth will wash comminuted material from between the teeth and this material will be carried downwardly into the chamber 11, the increasing depth of the teeth assisting in this operation since once the material has become dislodged it will readily travel downwardly. The upper jet of water will impinge on the top part of the ring of teeth and part of the impinging stream will be directed upwardly to above the ring 6. Accordingly material lying upon the top of the ring of teeth is dislodged and is further acted upon by the breakers.

With the arrangement described the jets of water discharging from the nozzles 28 under centrifugal pressure prevent clogging of material between the teeth and the rotor and wash comminuted material away from between the teeth and carry it into the chamber 11 where it will be dealt with in the manner described above. It is thereby ensured that the teeth are maintained in a clean and wholesome condition at the end of each comminuting operation. Furthermore, the jets of water will apply material to the teeth and assist in the comminuting operation.

It will be observed that each hollow breaker 22 is formed, at its inner radial extremity, with a wall 29 which is obliquely inclined with respect to the axis of rotation of the shaft 8, the axis of rotation being indicated at $a$. Extending substantially normally through the wall 29 is a nozzle 30 so that water under pressure will be directed upwardly of the rotor towards the axis $a$. It is to be understood that at least a pair of diametrically opposed breakers 22 are provided on the rotors 7 and each rotor is formed with an inclined wall 29 as described and each wall is provided with a nozzle 30. As a result at least two upwardly directed jets of water are produced and it is arranged that these jets converge at, or near to, the axis $a$.

Certain loose materials when wet form a coherent mass which if it rests on the rotor 7 can not be pulverised. On the other hand if the mass is carried outwardly it will clog the teeth 23 and, becoming lodged between the breakers 22 and the ring of teeth 6, will seriously impair the rotation of the rotor. Used tea leaves which in catering establishments, for instance, are commonly discharged into a comminuting apparatus in relatively large quantities is an example of such a material. Unless steps are taken to prevent these occurrences the apparatus may be brought to a standstill and the motor 9 burnt out. The upwardly directed jets of water leaving the nozzles 30 ensure that when such a mass is dropped through the opening 2 it is held in partial and temporary suspension and gradually passes between the breakers 22 and the ring of teeth 6 where it is acted upon and pulverised.

The jets of water from the nozzles 30 are directed towards the opposite side of the wall of the casing 5 and will ricochet therefrom in an upward direction to wash the wall and top of casing 5 and ensure that all material is carried downwardly past the rotor.

To sum up: firstly, the jets of water from the nozzle 30 maintain material such as tea leaves which tend to clog the rotor 7 in partial suspension and ensure that the mass is gradually fed to between the breakers 22 and the teeth 23 and they also act to wash down the casing 5 so that it is left in a clean and wholesome condition. Secondly, the jets from the nozzles 28 act to clean and clear the teeth 23 and to carry material downwardly into the chamber 11 as well as ensuring that clogging of material on the top of the ring 6 is prevented. Finally, the water ejected from the gap 25 washes the chamber 11 and carries comminuted material towards the outlet 13 from which it is discharged.

The arrangement described in which the comminuting apparatus is affixed to a sink the material to be treated is carried into the apparatus with water from the sink. However, in industrial kitchens, such as in catering establishments, it is arranged that the comminuted material is introduced into a bowl which is not supplied with water from the main. In such an arrangement a supply of water to flush material from the sink into the comminuting apparatus is provided by a branch pipe which is connected to a junction 34 on the outlet side of the valve 18. Accordingly, when the apparatus is started and valve 18 is opened, water is supplied, as described above, to the channel 15 and through junction 34 and the branch pipe to the sink bowl so that the material to be comminuted is delivered to the apparatus from the sink bowl with a stream of water. It will be appreciated that the water to the sink bowl is only supplied when the comminuting apparatus is in operation. The junction 34 is blocked off when not required to supply water as just described.

In an alternative arrangement utilising water thrown upwardly from the rotor to impinge on the material to be comminuted whereby it is prevented from impaction a jet (or jets) of water is (or are) directed down on to the rotor (e. g. from a nozzle in the casing 5) and will ricochet upwardly therefrom and at the same time will be thrown outwardly (thus washing the wall of casing 5) by centrifugal force due to rotation of rotor 7.

In yet another arrangement jets of water are directed centrifugally of the rotor in an outwardly, substantially horizontal direction against the wall of casing 5 above toothed ring 6 and part of the water will ricochet therefrom, being directed in an upward and inward direction (as in the arrangement first described) and will reduce or prevent impaction as well as washing down casing 5.

I claim:

1. A comminuting apparatus comprising a casing, a ring of teeth carried within the casing, a motor, a rotor driven by the motor and within the ring of teeth to co-act therewith to comminute material which falls upon the rotor, between the ring of teeth and the motor, ducts for the supply of water to within the rotor and nozzles for discharging the water upwardly of the rotor in a direction to reduce impaction of said material, the upwardly directed water impinging on the inner wall of the casing, said rotor being provided with interior passageways terminating in discharge nozzles in the surface of the rotor and said rotor being provided with hollow breakers to co-act with the ring of teeth, and said nozzles being in the walls of said breakers.

2. A comminuting apparatus comprising a vertically disposed casing having an opening near the top thereof for the introduction of material to be comminuted, a horizontal ring of teeth within the casing below the opening, a disc-like rotor having a side surface directed upwardly toward said opening, breakers carried by said rotor to co-act with said ring of teeth, a bearing carried by said casing and supporting said rotor for rotation within said ring of teeth, a motor secured to said casing and drivingly connected to said rotor, a duct for supplying water to the interior of said rotor, interior passageways in said rotor communicating with said duct and extending radially outwardly therefrom, upwardly directed nozzles in the upper surface of said rotor communicating with said passageways so that water supplied to said passageways from said duct, discharged through said nozzles under centrifugal force as upwardly directed jets which act on material introduced into said casing through said opening to reduce impaction of said material.

3. A comminuting apparatus according to claim 2 including at least a pair of said nozzles and in which said nozzles are arranged to direct said jets to converge substantially at the axis of rotation of said rotor.

4. A comminuting apparatus as claimed in claim 1 in which the inner radial part of each top wall of a breaker is inclined to the axis of rotation of the rotor and a nozzle passes substantially normally through said radial part, the streams discharging from the nozzles converging at, or near to, the axis of rotation of the rotor.

References Cited in the file of this patent
UNITED STATES PATENTS

| | | |
|---|---|---|
| 1,207,069 | Park | Dec. 5, 1916 |
| 2,044,564 | Carter | June 16, 1936 |
| 2,442,812 | Jordan | June 8, 1948 |
| 2,656,895 | Backlund et al. | Oct. 27, 1953 |